Figure 1:
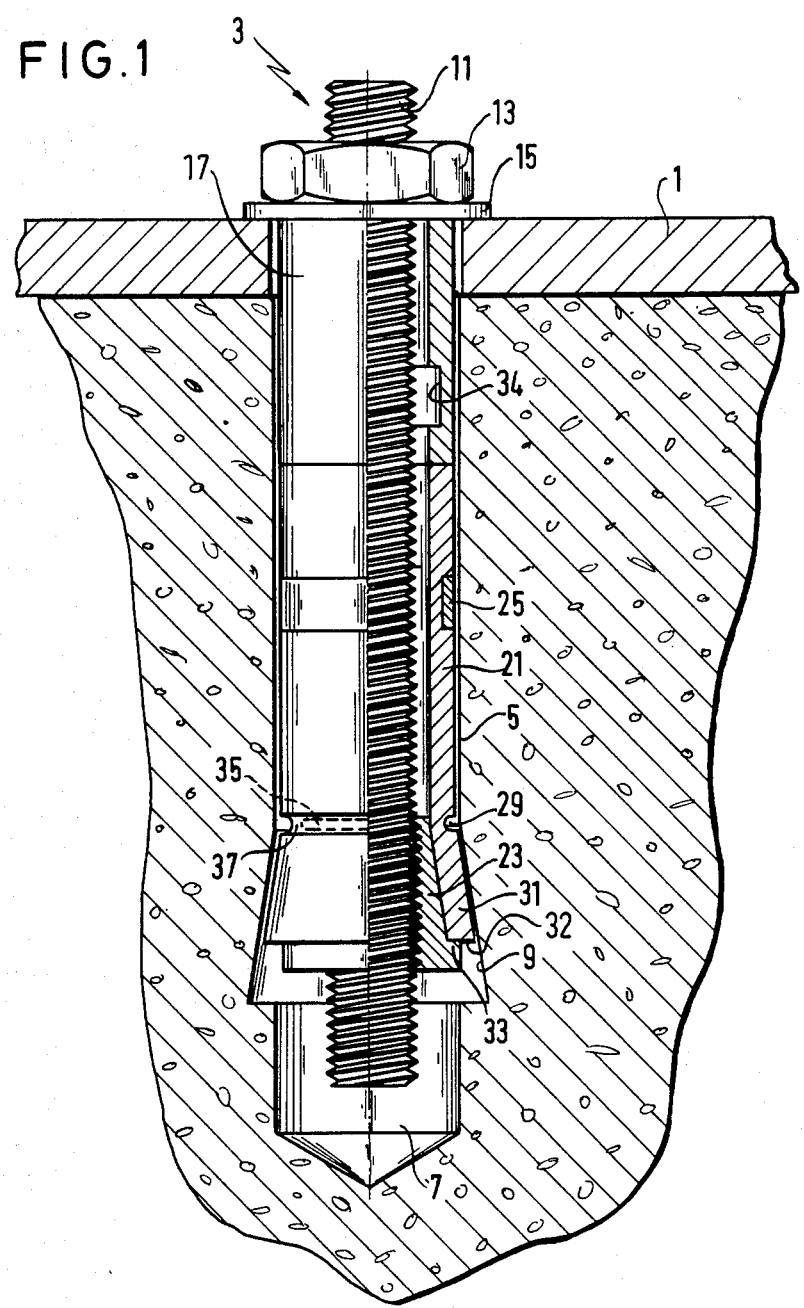

United States Patent [19]

Mächtle

[11] Patent Number: 4,519,735
[45] Date of Patent: May 28, 1985

[54] EXPANSION ANCHOR

[75] Inventor: Roland Mächtle, Grunertshofen, Fed. Rep. of Germany

[73] Assignee: Werkzeugfabrik Fritz Machtes GmbH & Co. K.G., Munich, Fed. Rep. of Germany

[21] Appl. No.: 306,717

[22] Filed: Sep. 29, 1981

[30] Foreign Application Priority Data

Sep. 18, 1981 [DE] Fed. Rep. of Germany ....... 3137226

[51] Int. Cl.$^3$ ...................... E21D 20/00; E21D 21/00
[52] U.S. Cl. ...................................... 411/65; 405/259; 411/44; 411/55
[58] Field of Search ....................... 411/55, 57, 56, 44, 411/65; 405/259, 260, 261

[56] References Cited

U.S. PATENT DOCUMENTS

| 1,320,622 | 11/1919 | Kennedy | 411/34 |
| 3,524,379 | 8/1970 | Fischer | 411/65 |
| 4,011,786 | 3/1977 | Liebig | 411/57 |
| 4,028,988 | 6/1977 | Schafers | 411/44 |
| 4,339,217 | 7/1982 | Lacey | 411/55 |

FOREIGN PATENT DOCUMENTS

| 276186 | 6/1965 | Australia | 411/44 |
| 2331467 | 6/1973 | Fed. Rep. of Germany |  |
| 2613499 | 3/1976 | Fed. Rep. of Germany | 411/55 |
| 2819289 | 2/1978 | Fed. Rep. of Germany |  |
| 3025816 | 4/1982 | Fed. Rep. of Germany | 411/65 |
| 454771 | 2/1950 | Italy | 411/55 |
| 7402180 | 8/1975 | Netherlands | 411/55 |

Primary Examiner—Dennis L. Taylor
Attorney, Agent, or Firm—Wood, Dalton, Phillips Mason & Rowe

[57] ABSTRACT

An expansion anchor (3) is provided for retention in an approximately cylindrical well hole (7) having a conical enlargement (9) at a distance from the well opening and widening toward the well hole floor. The expansion anchor (3) is provided on its sleeve or ring-shaped latch supporting member (21) with at least two latches (31) flaring downhole and adapted to be deflected into the enlargement (9). Screwed onto a threaded spindle (11) extending through the latch supporting member (21) is an expansion cone (23) tapering up to the well opening, by means of which the latches (31) are urged into surface engagement with the conical enlargement (9) in the wall of the well hole. The expansion cone (23) is provided with an abutment (33) facing uphole, and the latch supporting member or the latches are provided with an oppositely facing abutment (32) extending into the withdrawal path of the expansion cone (23).

11 Claims, 2 Drawing Figures

EXPANSION ANCHOR

Conventional expansion anchors are comprised of an expanding sleeve, a screw threaded bolt extending through the expanding sleeve to hold the load to be secured, and an expansion cone screwed onto the threaded bolt for radially expanding the sleeve and urging its expanding lobes into surface contact with the wall of the cylindrical well hole. It has been found, however, that in many applications, particularly in reactor construction, the retention forces attainable with expansion anchors of this type are insufficient.

The German published patent application OS No. 28 19 289 discloses an expansion anchor which is provided, in addition to the expanding sleeve adapted to be acted on by the expansion cone, with a ring-shaped supporting member for three latches being radially deflected by means of an additional expansion cone, as the expansion anchor is tightened by the action of a screw threaded bolt extending through the expansion sleeve, the two expansion cones and the latch supporting member. The cylindrical well hole has a likewise cylindrical enlargement of a greater diameter. The deflected latches extend in rear of the uphole shoulder of the enlargement. The cone angle of the expansion cone spreading the latches apart is greater than the cone angle of the expanding sleeve so that during the tightening of the expansion anchor, first the sleeve is expanded followed by the latching members spreading out. The free ends of the latching members facing the well opening are individually linked by joints to the latch supporting member. However, since the deflected latching members of this prior art expansion anchor engage the walls of the hole enlargement merely along their edges, there is danger that they might break out of the latch supporting member, especially in unevenly drilled and enlarged well holes, causing the expansion anchor to be pulled out of the well hole.

Another expansion anchor is known from the German published patent application OS No. 23 31 467. This expansion anchor is provided with a sleeve type latch supporting member having expanding lobes projecting downhole. An expansion cone, held in position between the expanding lobes by a screw threaded bolt, urges the expanding lobes in surface engagement with a conical enlargement of the well hole. In order to prevent the expansion cone from being retracted through the latch supporting member in the event of a later occurrence of subterranean fissures running through the well hole, the latch supporting member is constructed in one piece in the form of a sleeve, and the expansion cone is provided with a tubular extension reaching up the well hole opening. Such measures are structurally complex and costly.

It is the object of the present invention to provide a structurally simple expansion anchor, in which the expansion cone is prevented from being retracted up through the latch support even in the event of fissures occurring in the well floor at a later point in time.

This is accomplished by the expansion anchor according to the present invention in that the expansion cone tapering up to the well hole is provided with a shoulder or an abutment facing upward to the well opening, and in that further the latch supporting member or the latches are provided with a shoulder or an abutment facing in the opposite direction and projecting into the path of retraction of the expansion cone. Such shoulders or abutments can be produced without difficulty. The expansion cone remains in secure engagement with the latching members and/or the latch supporting member, respectively, even if underground cracks may lead to a radial widening of the well hole.

According to a first embodiment of the invention, the expansion cone is provided on its larger diameter face with a radially outwardly projecting flange-like shoulder overlapping with the free ends of the latching members in their spread out condition. It is impossible for an expansion cone of this type to be pulled up through the latching members, especially where a split latch supporting member resp. expansion sleeve is used.

In another embodiment of the invention, the latch supporting member or the latches themselves are provided with at least one radially inwardly projecting shoulder extending in front of the smaller diameter face of the expansion cone. Also this embodiment is of significance, particularly when split latch supporting members are used which are made up of a plurality of shells, because this type of latch support may readily be provided with an abutment or shoulder as proposed by the invention, by way of cold working.

The latching members are preferably constructed in the form of outwardly expanding lobes which are connected to a tubular member or sleeve by means of an annular groove acting much like a hinged joint. This type of expansion anchor cannot be withdrawn from the well hole without destroying the hole walls. In addition, the latching members may be downhole hinged extensions of the lobes of an expansion sleeve so that the holding power of the expansion anchor is further enhanced, over and above the retaining force exerted by the latches in their outwardly deflected position.

The angle of deflection of the latches should be as large as possible. For this reason, the latches should have a uniform wall thickness, as viewed in an axial longitudinal section. In addition to the wall thickness of the latches, the angle of deflection is also influenced by the cone angle of the expansion cone. Preferably, the cone angle is greater than 5° and should be between 8° and 10°, notably 9°, measured between the cone axis and the cone shell.

In order to support the completely deflected latches over their entire surface area, the cone angle of the expansion cone is preferably approximately equal to the cone angle of the conical well enlargement. Similarly, the length of the latches is approximately equal to the slant height of the expansion cone.

To make the best use of the expansionary effect of the expansion cone, the radial thickness of the latches should approach as closely as possible the radial expansion capacity of the expansion cone. Optimal relationships are obtained when the largest diameter of the expansion cone in its closed condition is approximately equal to the outer diameter of the circle of latches peripherally surrounding the expansion cone, and when further the smaller diameter face of the expansion cone is approximately equal to the diameter of the inner circumference of the side of the latches facing the expansion cone. The largest diameter of the expansion cone should be so selected that the expansion cone is still capable of being inserted, together with the latch supporting member, into the cylindrical section of the well hole. The maximum expansion may be obtained if substantially the entire cone height is available for the expansion of the latches, meaning the absence of interior conical surfaces on the latches which would extend over considerable axial lengths of the latches. Preferably, the latches are of uniform thickness over their entire length.

The latch supporting member is braced preferably directly or by way of a spacer member against the structural element to be fastened or against the head of the screw threaded bolt located outside the well hole. For distance compensation during the tightening of the expansion anchor, an additional conical sleeve may be disposed between the latch supporting member and the uphole spacer sleeve. In a preferred embodiment, the screw threaded bolt extends through a tubular member disposed between the expansion cone and the well hole opening and being provided with an annular groove. The wall thickness of the tubular member in the region of the annular groove is reduced an amount such that the tubular member is capable of being axially deformed subsequent to the initial taking hold action of the expansion anchor. A tubular member, especially one made of metal, will absorb without difficulty axial forces occurring during the lowering of the expansion anchor into the well hole. The annular groove is preferably provided on the interior surface of the tubular member, because then the bottom of the groove being subjected to deformation forces as the expansion anchor is being tightened, is prevented from being deformed an extent up to the threaded spindle, and thus is prevented from interfering with the tensioning movement of the threaded spindle. An annular groove of this type is of import not only for the expansion anchor described in the foregoing, but may also be employed to advantage in other embodiments of expansion anchors and bolts. The annular groove may be provided on a separate sleeve shaped member which, for example, may also serve as a spacer. The term "tubular member" is understood to include sleeves which consist of a plurality of shells or individual segments. Preferably, the annular groove has an approximately rectangular cross section, with the groove bottom running about parallel to the opposite wall of the sleeve.

Figure 2:
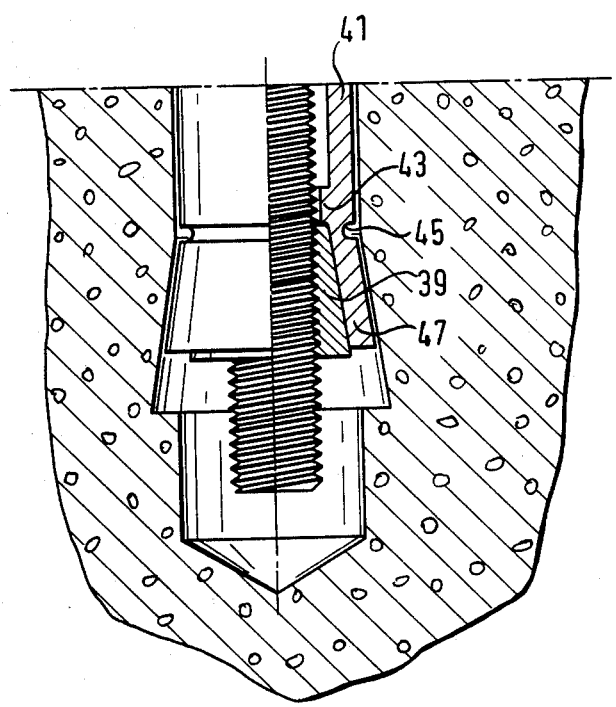

The invention will be described in further detail with reference to illustrative embodiments represented in the drawings, in which:

FIG. 1 is a partial axial section through a first embodiment of the expansion anchor set into a well hole, and FIG. 2 is a partial view of another embodiment of the expansion anchor according to the invention.

Referring to FIG. 1, a structural element 1 is to be secured by passing through it an expansion anchor 3 which is then inserted into a cylindrical well hole 5 provided in its bottom region with an enlargement 9 conically tapering toward the well opening. The conical enlargement 9 was produced later in the wall of the cylindrical well hole by an expandable milling or grinding tool.

Disposed in series on a threaded spindle 11 are a hex nut 13, a washer 15, a spacer member 17, an expansion sleeve 21 and a cone nut 23. The expansion sleeve 21 consists of a plurality of circumferentially split shells held together by a spring or lock washer 25 in the region of the uphole end of the sleeve. In the region of the diameter transition point, between the cylindrical hole 5 and the conical enlargement 9, the expansion shells 21 are provided on their outer periphery with an annular groove 29. The sections of the sleeve shells extending from the annular groove 29 downward toward the well hole bottom 7 form lobe-like projections 31 also called latches and which are hingedly deflected by the action of the cone nut 23 into the conical enlargement 9 as the expansion anchor is being tightened. Hence, the latches 31 flare outwardly from the uphole section of the cylindrical hole 5 so that it is impossible to retract the expansion anchor without destroying the wall of the well hole.

The cone nut 23 tapers up to the well hole opening. Its cone angle is about 8° to 10° and is approximately equal to the cone angle of the enlargement 9. The latches 31 are of uniform wall thickness in the axial direction to ensure a maximum expansion angle. The larger diameter base of the conical nut 23 is provided with a radially outwardly projecting annular flange 33 providing an abutment surface which extends well into the region of the free downhole abutment end face 32 of the latch 31. Even if the well hole has been drilled to excess dimensions, it is impossible to pull the cone nut 23 out through the expansion sleeve 21. The outer diameter of the annular flange 33 corresponds approximately to the outer diameter of the latches 31, or the expansion sleeve 21, respectively, in the non-tensioned condition. The diameter of the smaller diameter face of the cone nut 23 is approximately equal to the inner diameter of the latches 31 in the region of their free side. Thus, almost the entire slant height of the cone nut 23 is available for the deflection of the latches 31. The radial width of the annular flange 33 is less than one half of the radial thickness of the latches 31. The spacer sleeve 17 made of metal is provided on its inner periphery with an annular groove 34 of rectangular cross section, acting as a distance compensating element. The expansion anchor may be driven into the well hole in a snug fit without causing a deformation of the wall section of the spacer sleeve 17 weakened by the annular groove 34. The thickness of the remaining wall of the spacer sleeve 17 in the region of the annular groove 34 is so selected as to cause a deformation of the spacer 17 during the tightening of the expansion anchor only after the latches 31 have at least in part been deflected into the enlargement 9. The annular groove 34 may also be provided on the shells of the expansion sleeve 21. This, however, is not illustrated.

Instead of the annular groove 34 may also be provided some other axially yieldable spacer element, such as a resilient gasket or the like, between the spacer sleeve 17 and the expansion sleeve 21. Similarly, instead of an expansion sleeve consisting of a plurality of shells may also be used a one piece sleeve having expanding lobes thereon produced by providing slits in the sleeve. Furthermore, the latching members 31 may be constituted by separate structural elements attached by hinged joints or pin connections to a sleeve or ring-shaped supporting member.

In addition to, or in place of, the groove 29 constituting the hinged joint of the latches 31, the shells of the expansion sleeve 21 may be provided with circumferentially extending slits, as they are shown in broken lines at 35 in FIG. 1. Preferably, the slits extend from the longitudinal edge of a shell symmetrically toward the center of the shell and form in the longitudinal center plane of the shell a web-like section which acts as a joint retaining the latch 31 integrally on the shell. Such web is indicated in FIG. 1 at 37. The last described embodiment permits of latches which are relatively wide in the circumferential direction and which, due to their curved shape, are capable of assuming a defined deflected position in the conical enlargement 9 of the well hole.

FIG. 2 shows another embodiment of the expansion anchor which is distinguished from the embodiment of FIG. 1 merely by the particular location of the shoulders or abutments which prevent the cone nut designated 39 in FIG. 2 from being retracted through the expansion sleeve designated 41 in FIG. 2. The expansion sleeve, again consisting of a plurality of axially split shells, is provided on its interior surface with a radially inwardly projecting flange or collar 43 which has an abutment face in the path of withdrawal of the smaller diameter abutment surface 45 of the cone nut 39. The advantage of this embodiment is that the entire axial length of the cone nut is available for the spreading of the latches 47 whereby particularly good expansion values are obtained.

In use the hex nut 13 is screwed onto the threaded spindle 11 to move said spindle and thus pull the cone nut 23 upward to the position seen in the drawings in which the latches 31 are deflected into the enlargement 9 and the abutment surface of the cone nut is against the abutment face of the sleeve means. Continuing pressure exerted by screwing down the hex nut 13 causes outward deformation of the spacer sleeve 17 at the annular groove 34, which results in a sufficient shortening of the sleeve for the nut 13 and washer 15 to act as radially enlarged clamping means which clamp the structural element 1 forcefully against the body in which the well hole 5 is formed. It is obvious that the same result could be reached by using a threaded spindle with a hex head.

I claim:

1. In an expansion anchor for retention in an approximately cylindrical well hole that is in a body and is provided at a distance from the well hole opening with a conical enlargement flaring toward the bottom of the well hole, sleeve means including a plurality of longitudinally separated shells defining at least two circumferentially spaced latches for insertion into said well hole, a threaded bolt that extends through said sleeve means and has an outer end portion projecting from the well hole opening, a cone screwed onto said bolt and retractable to deflect said latches into engagement with the conical enlargement by movement of the threaded bolt, and radially enlarged clamping means on the outer end portion of the threaded bolt, the improvement comprising, in combination:

a radially extending abutment surface on said cone facing toward the opening of the well hole;
radially extending abutment face means on said sleeve means in facing relationship to said surface and projecting into the path of retraction of said cone to positively limit movement of the cone toward the well hole opening;
and an internal annular groove in said sleeve means, said groove reducing the wall thickness of said sleeve means an amount such that the sleeve means is capable of being deformed outwardly in the region of said groove to shorten the sleeve means by continued movement of the threaded bolt after the latches have initially engaged within said well hole and the abutment surface means is against the abutment face means, whereby the sleeve means is deformed without clamping onto the threaded bolt and the radially enlarged clamping means may clamp an element against said body.

2. The improvement of claim 1 wherein the sleeve means includes a tubular spacer disposed between said latches and the opening of said well hole and said annular groove is in said tubular spacer.

3. The improvement of claim 2 in which the cone has a radially extending flange that provides said radially extending surface, and said radially extending face means is at the ends of said latches.

4. The improvement of claim 2 in which the sleeve means has internal radial shoulder means that provides said radially extending face means, and the cone has a smaller end which provides said radially extending surface.

5. The improvement of claim 1 in which the cone has a radially extending flange that provides said radially extending surface, and said radially extending face means is at the ends of said latches.

6. The improvement of claim 1 in which the sleeve means has internal radial shoulder means that provides said radially extending face means, and the cone has a smaller end which provides said radially extending surface.

7. In an expansion anchor for retention in an approximately cylindrical well hole that is in a body and has a open outer end, said expansion anchor comprising sleeve means including a plurality of longitudinally separated shells for insertion into said hole, a threaded bolt that extends through said sleeve means and has an outer end portion projecting from the well hole, a cone screwed onto said bolt so that movement of the threaded bolt moves the cone toward the outer end of the well hole and expands the shells into engagement with the inner surface of said well hole, and radially enlarged clamping means on the outer end portion of the threaded bolt the improvement comprising:

abutment means on the sleeve means and the cone which engage to positively limit movement of the cone toward the outer end of the well hole;
and an internal annular groove in said sleeve means, said groove reducing the wall thickness of said sleeve means an amount such that the sleeve means is capable of being deformed outwardly in the region of said groove to shorten the sleeve means by continued movement of the threaded bolt, after the shells have initially engaged within said well hole and the abutment means are engaged, whereby the sleeve means is deformed without clamping onto the threaded bolt and the radially enlarged clamping means may clamp an element against said body.

8. The improvement of claim 7, wherein the sleeve means includes a tubular spacer disposed between said split shells and the opening of said well hole, and said annular groove is in said tubular spacer.

9. The improvement of claim 7 which includes a band encircling the shells of the sleeve means.

10. The improvement of claim 7 in which the sleeve means is provided with an annular groove which acts as a hinge joint for the shells.

11. The improvement of claim 7 which includes circumferential slits in the sleeve means which act as hinge joints for the shells.

* * * * *